United States Patent
Tagami et al.

(10) Patent No.: US 9,442,043 B2
(45) Date of Patent: Sep. 13, 2016

(54) VEHICLE TEST APPARATUS AND VEHICLE TEST SYSTEM

(71) Applicant: JTEKT CORPORATION, Osaka-shi, Osaka (JP)

(72) Inventors: Masaharu Tagami, Kashihara (JP); Tomoyasu Kada, Kaizuka (JP); Ryouhei Hayama, Nabari (JP); Takeshi Watanabe, Kashihara (JP); Aris Maroonian, Nara (JP)

(73) Assignee: JTEKT CORPORATION, Osaka (JP)

( * ) Notice: Subject to any disclaimer, the term of this patent is extended or adjusted under 35 U.S.C. 154(b) by 171 days.

(21) Appl. No.: 14/256,316

(22) Filed: Apr. 18, 2014

(65) Prior Publication Data

US 2014/0318264 A1 Oct. 30, 2014

(30) Foreign Application Priority Data

Apr. 26, 2013 (JP) ................. 2013-094081

(51) Int. Cl.
*G01M 17/04* (2006.01)
*G01M 17/007* (2006.01)
*G01M 17/06* (2006.01)

(52) U.S. Cl.
CPC .......... *G01M 17/007* (2013.01); *G01M 17/04* (2013.01); *G01M 17/06* (2013.01)

(58) Field of Classification Search
CPC .................................................. G01M 17/04
USPC ......................................................... 73/669
See application file for complete search history.

(56) References Cited

U.S. PATENT DOCUMENTS

| 4,263,809 | A  | * | 4/1981 | Petersen et al. ............... 73/798 |
| 5,111,685 | A  | * | 5/1992 | Langer ....................... 73/118.01 |
| 5,942,673 | A  |   | 8/1999 | Horiuchi et al. |
| 6,503,319 | B1 |   | 1/2003 | Courage et al. |
| 7,054,727 | B2 |   | 5/2006 | Kemp et al. |
| 7,058,488 | B2 | * | 6/2006 | Kemp et al. ..................... 73/669 |
| 7,971,486 | B2 |   | 7/2011 | Melz et al. |
| 8,881,585 | B2 | * | 11/2014 | Preising et al. ........... 73/116.01 |
| 8,955,397 | B2 |   | 2/2015 | Saari et al. |

(Continued)

FOREIGN PATENT DOCUMENTS

| DE | 10 2011 120171 A1 | 6/2012 |
| JP | 2000-512610 A | 9/2000 |

(Continued)

OTHER PUBLICATIONS

Oct. 24, 2014 Search Report and Written Opinion issued in European Application No. 14165586.

(Continued)

*Primary Examiner* — Eric S McCall
(74) *Attorney, Agent, or Firm* — Oliff PLC

(57) ABSTRACT

A vehicle test apparatus includes: a test article installation vehicle body to which four axles corresponding to four wheels that are a left front wheel, a right front wheel, a left rear wheel and a right rear wheel are attached, and on which a test article is installed; a first motion base that supports the test article installation vehicle body, and that allows the test article installation vehicle body to make motions of six degrees of freedom; and four second motion bases each of which supports a corresponding one of the axles, and each of which allows a corresponding one of the axles to make motions of six degrees of freedom.

6 Claims, 15 Drawing Sheets

(56) References Cited

U.S. PATENT DOCUMENTS

| | | | |
|---|---|---|---|
| 2003/0230137 A1* | 12/2003 | Kemp et al. | 73/117 |
| 2004/0230394 A1* | 11/2004 | Saari et al. | 702/113 |
| 2005/0145034 A1* | 7/2005 | Lenzen et al. | 73/669 |
| 2007/0256484 A1 | 11/2007 | Imanishi et al. | |
| 2007/0260438 A1 | 11/2007 | Langer et al. | |
| 2013/0104670 A1* | 5/2013 | Saari et al. | 73/862.381 |
| 2014/0318229 A1* | 10/2014 | Tagami | 73/117.01 |
| 2014/0318264 A1 | 10/2014 | Tagami et al. | |

FOREIGN PATENT DOCUMENTS

| | | |
|---|---|---|
| JP | A-2006-138827 | 6/2006 |
| JP | A-2008-175778 | 7/2008 |
| JP | 2009-220184 A | 10/2009 |
| JP | A-2009-536736 | 10/2009 |
| WO | 2013/059547 A1 | 4/2013 |

OTHER PUBLICATIONS

Bernzen, Werner, "Active Vibration Control of Flexible Robots Using Virtual Spring-damper Systems," Journal of Intelligent and Robotic Systems, (1999) vol. 24, pp. 69-88.

Hogan, Neville, "Impedance Control: An Approach to Manipulation," Journal of Dynamic Systems, Measurement, and Control, (1985) vol. 107, pp. 1-24.

Oct. 24, 2014 Extended European Search Report issued in European Patent Application No. 14 16 5588.

U.S. Appl. No. 14/256,636, filed Apr. 18, 2014 in the name of Tagami.

Mar. 10, 2016 Office Action issued in U.S. Appl. No. 14/256,636.

Oct. 5, 2015 Office Action issued in U.S. Appl. No. 14/256,636.

\* cited by examiner

VEHICLE TEST APPARATUS AND VEHICLE TEST SYSTEM

INCORPORATION BY REFERENCE

The disclosure of Japanese Patent Application No. 2013-094081 filed on Apr. 26, 2013 including the specification, drawings and abstract is incorporated herein by reference in its entirety.

BACKGROUND OF THE INVENTION

1. Field of the Invention

The invention relates to a vehicle test apparatus that conducts performance tests on automotive parts or vehicles, and a vehicle test system including the vehicle test apparatus.

2. Description of the Related Art

Japanese Patent Application Publication No. 2008-175778 describes a vehicle test apparatus including: a pair of front and rear transversely movable bases that are movable in the transverse direction; four groups of hydraulic cylinders that make motions of six degrees of freedom, the four groups of hydraulic cylinders consisting of two pairs of right and left groups of hydraulic cylinders disposed on the top face of the front transversely movable base and two pairs of right and left groups of hydraulic cylinders disposed on the top face of the rear transversely movable base; four swivel lift bases that are respectively connected to upper ends of the four groups of hydraulic cylinders; and four turning belts that are respectively provided on the four swivel lift bases and on which four wheels of a vehicle are disposed. Refer also to Japanese Patent Application Publication No. 2006-138827 and Japanese Patent Application Publication No. 2009-536736.

While an actual vehicle is, for example, accelerating, decelerating or turning, an inertial force acts on a vehicle body of the vehicle. In the above-described conventional test apparatus, in order to apply such an inertial force to a vehicle body, it is necessary to cause the vehicle body to move relative to turning belts that support wheels by turning the turning belts.

SUMMARY OF THE INVENTION

One object of the invention is to provide a vehicle test apparatus that is able to apply forces similar to inertial forces that are applied to a vehicle body of an actual vehicle while the actual vehicle is, for example, accelerating, decelerating or turning, to a vehicle body of a test article without causing the vehicle body of the test article to move relative to members that support wheels, and to provide a vehicle test system including the vehicle test apparatus.

A vehicle test apparatus according to an aspect of the invention includes: a test article installation vehicle body to which four axles corresponding to four wheels that are a left front wheel, a right front wheel, a left rear wheel and a right rear wheel are attached, and on which a test article is installed; a first motion base that supports the test article installation vehicle body, and that allows the test article installation vehicle body to make motions of six degrees of freedom; and four second motion bases each of which supports a corresponding one of the axles, and each of which allows a corresponding one of the axles to make motions of six degrees of freedom.

In the vehicle test apparatus according to the above aspect, forces can be directly applied to the test article installation vehicle body by the first motion base in the state where the axles are supported by the second motion bases. Thus, forces similar to the inertial forces that are applied to the vehicle body of the actual vehicle during, for example, acceleration, deceleration, or turning of the actual vehicle, can be applied to the test article installation vehicle body without causing the test article installation vehicle body to move relative to the members that support the wheels (axles).

A vehicle test system according to another aspect of the invention includes: the vehicle test apparatus according to the above aspect; and a control unit that controls the motion bases.

With the vehicle test system according to the above aspect, forces similar to the inertial forces that are applied to the vehicle body of the actual vehicle during, for example, acceleration, deceleration, or turning of the actual vehicle, can be applied to the test article installation vehicle body without causing the test article installation vehicle body to move relative to the members that support the wheels (axles).

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
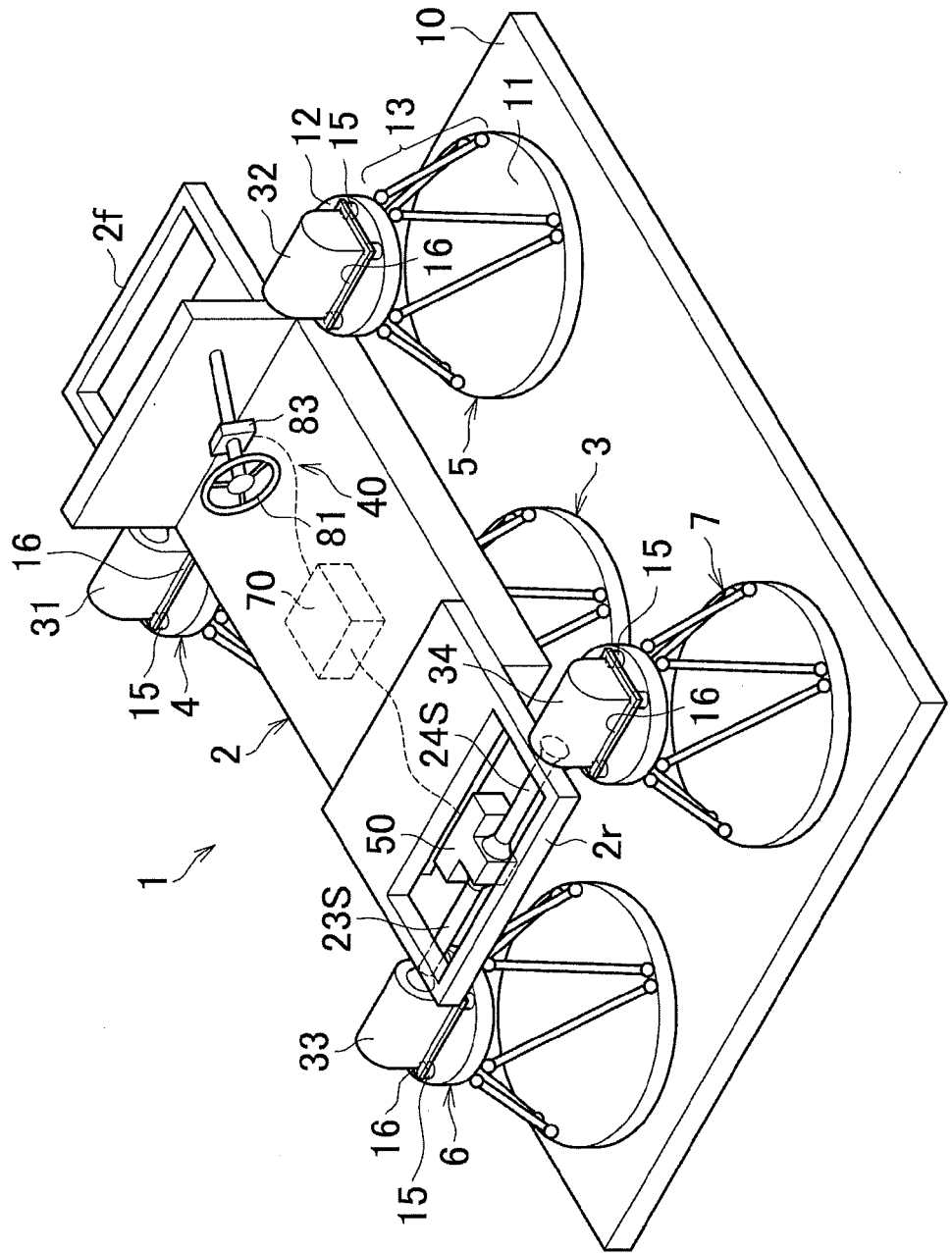
FIG. 1 is a perspective view schematically illustrating the appearance of a vehicle test apparatus according to a first embodiment of the invention.
Figure 2:
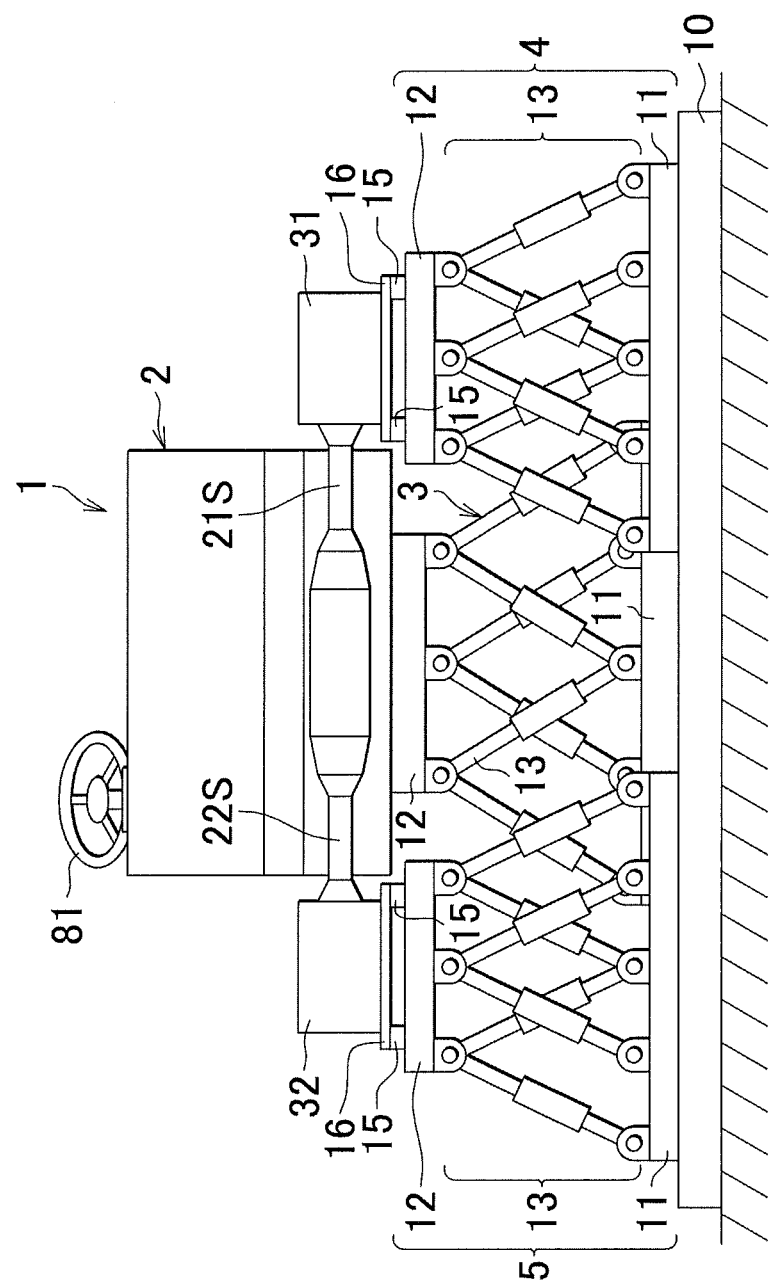
FIG. 2 is a front view schematically illustrating the vehicle test apparatus in FIG. 1.
Figure 3:
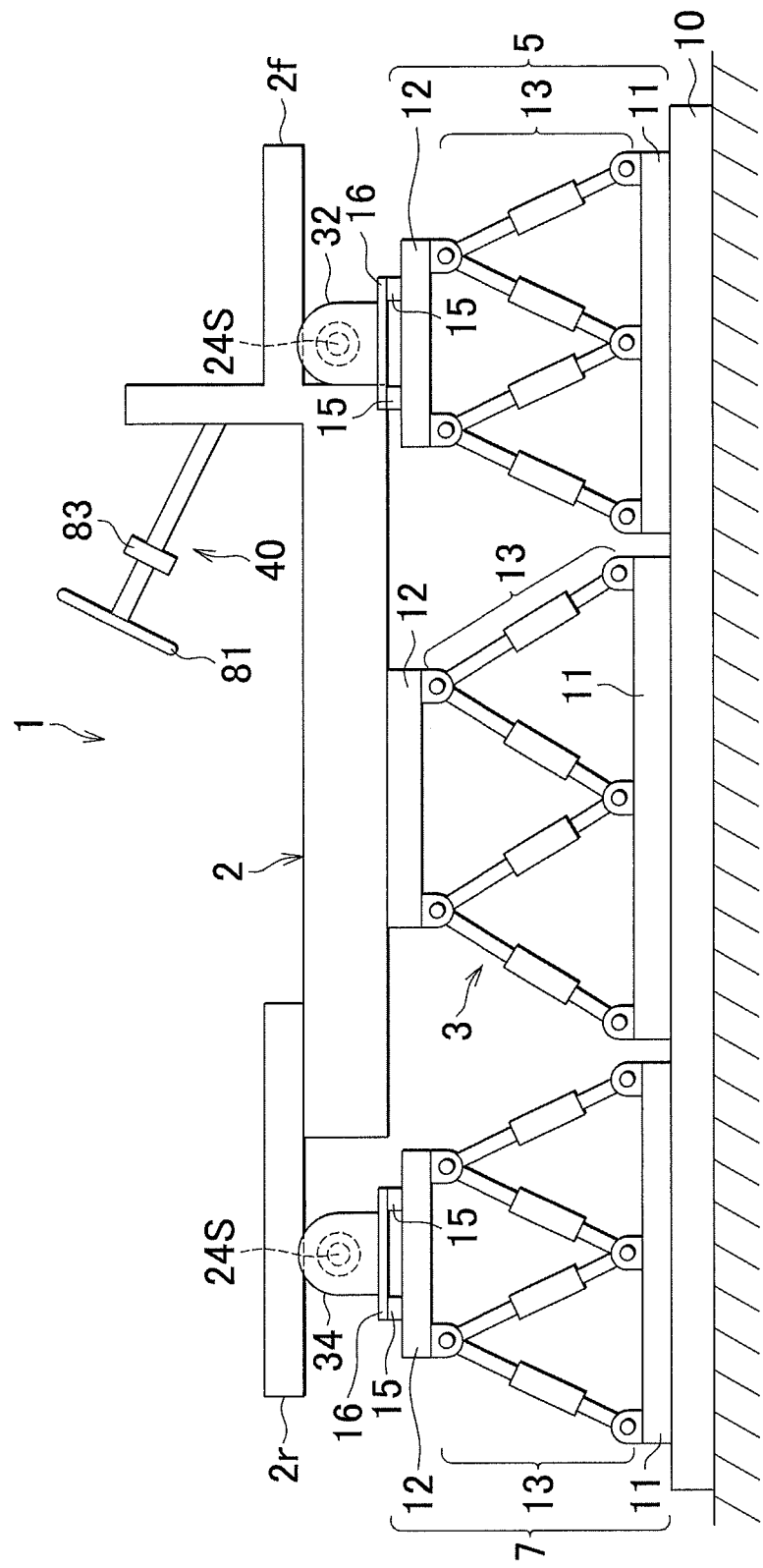
FIG. 3 is a side view schematically illustrating the vehicle test apparatus in FIG. 1.
Figure 4:
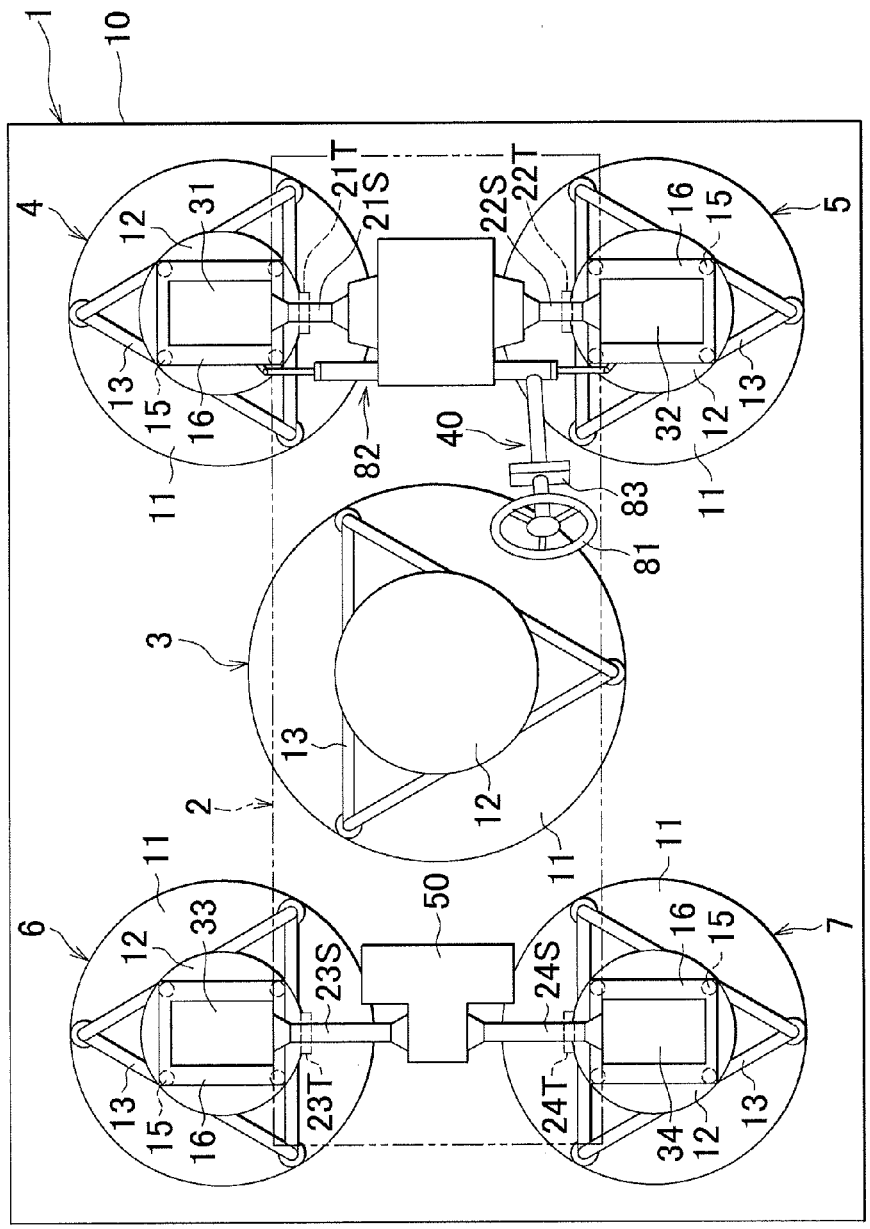
FIG. 4 is a plan view schematically illustrating the vehicle test apparatus in FIG. 1.

Hereinafter, example embodiments of the invention will be described with reference to the accompanying drawings. A vehicle test apparatus 1 includes: a test article installation vehicle body 2 to which four axles 21S, 22S, 23S, 24S respectively corresponding to a left front wheel, a right front wheel, a left rear wheel and a right rear wheel are attached, and on which a test article is installed; a first motion base 3 that supports the test article installation vehicle body 2, and that causes the test article installation vehicle body 2 to make motions of six degrees of freedom; and four second motion bases 4, 5, 6, 7 that respectively support the axles 21S, 22S, 23S, 24S, and that respectively cause the axles 21S, 22S, 23S, 24S to make motions of six degrees of freedom.

In FIG. 1 to FIG. 4, a front end of the test article installation vehicle body 2 is denoted by a reference symbol 2$f$, and a rear end thereof is denoted by a reference symbol 2$r$. No vehicle wheels are fitted to the four axles 21S, 22S, 23S, 24S of the test article installation vehicle body 2. Output shafts of four electric motors (hereinafter, referred to as "external force applying motors") 31, 32, 33, 34 that apply torques to the four axles 21S, 22S, 23S, 24S of the test article installation vehicle body 2 are connected to outer end portions of the four axles 21S, 22S, 23S, 24S of the test article installation vehicle body 2. The external force applying motors 31, 32, 33, 34 apply torques, which are similar to the torques (external forces) externally applied to axles of an actual vehicle when the actual vehicle is travelling, individually to the corresponding axles 21 S, 22S, 23 S, 24S. The external forces include, for example, rotational loads that are applied to the axles of the actual vehicle due to road surface frictions or the like when the actual vehicle is travelling, and torques that are applied to the axles via a road surface when the actual vehicle is travelling on a downhill slope.

Test articles of automotive components of various kinds are installed on the test article installation vehicle body 2. In the present embodiment, an electric power steering system (EPS) 40, and a rear wheel drive module 50 that drives the axle 23S for the left rear wheel and the axle 24S for the right rear wheel with the use of the electric motors are installed, as the test articles, on the test article installation vehicle body 2. In the present embodiment, the EPS 40 is a column assist-type EPS. As is well known, the EPS 40 includes a steering wheel 81, a steering mechanism 82 that steers the front wheels in response to turning of the steering wheel 81, and a steering assist mechanism 83 that assists a driver in performing a steering operation. Note that, in the present embodiment, the steering mechanism 82 is not connected to the front wheels because no front wheels are provided. The steering wheel 81 and the steering mechanism 82 are mechanically linked to each other via a steering shaft.

The steering mechanism 82 includes a rack-and-pinion mechanism including a pinion provided at a lower end of the steering shaft, and a rack shaft having a rack that is meshed with the pinion. The steering assist mechanism 83 includes an electric motor 41 (refer to FIG. 11, hereinafter referred to as "assist motor 41") that generates a steering assist force, and a speed reduction mechanism (not illustrated) that transmits a torque output from the assist motor 41 to the steering shaft.

The EPS 40 includes an ECU42 (refer to FIG. 11, hereinafter referred to as "EPS ECU 42") that controls the assist motor 41, and a linear displacement sensor (not illustrated) that detects an axial displacement position of the rack shaft. The rear wheel drive module 50 includes an electric motor 51 (refer to FIG. 11, hereinafter referred to as "rear wheel drive motor 51") that rotates the axles 23S, 24S for the rear wheels, a transmission mechanism (not illustrated) that transmits a torque from the rear wheel drive motor 51 to the axles 23S, 24S for the rear wheels, an ECU 52 (refer to FIG. 11, hereinafter referred to as "rear wheel drive motor ECU 52") that controls the rear wheel drive motor 51, and a rotation angle sensor (not illustrated) that detects a rotation angle of at least one of the axles 23S, 24S for the rear wheels. The transmission mechanism includes a clutch and a speed reduction mechanism. However, the transmission mechanism may include only one of the clutch and the speed reduction mechanism.

The motion bases 3, 4, 5, 6, 7 are secured to a base plate 10 disposed on a floor. As is well known, each of the motion bases 3, 4, 5, 6, 7 includes a stationary base 11 secured to the base plate 10, a movable base (moving base) 12 disposed above the stationary base 11, an actuator 13 that is disposed between and connected to the stationary base 11 and the movable base 12 and that causes the movable base 12 to make motions of six degrees of freedom (longitudinal, transverse, vertical, rolling, pitching and yawing motions), and a motion controller (not illustrated) that executes drive control of the actuator 13. The actuator 13 is composed of six electric cylinders.

The test article installation vehicle body 2 is secured to the movable base 12 of the first motion base 3, with a center portion of the test article installation vehicle body 2 disposed on the movable base 12 of the first motion base 3. That is, the center portion of the bottom face of the test article installation vehicle body 2 is attached to the top face of the movable base 12 of the motion base 3. The external force applying motor 31 is mounted on the movable base 12 of the second motion base 4 on the left front side via a plurality of elastic bodies 15 and a motor attachment plate 16. The external force applying motor 32 is mounted on the movable base 12 of the second motion base 5 on the right front side via a plurality of elastic bodies 15 and a motor attachment plate 16. The external force applying motor 33 is mounted on the movable base 12 of the second motion base 6 on the left rear side via a plurality of elastic bodies 15 and a motor attachment plate 16. The external force applying motor 34 is mounted on the movable base 12 of the second motion base 7 on the right rear side via a plurality of elastic bodies 15 and a motor attachment plate 16.

Figure 5:
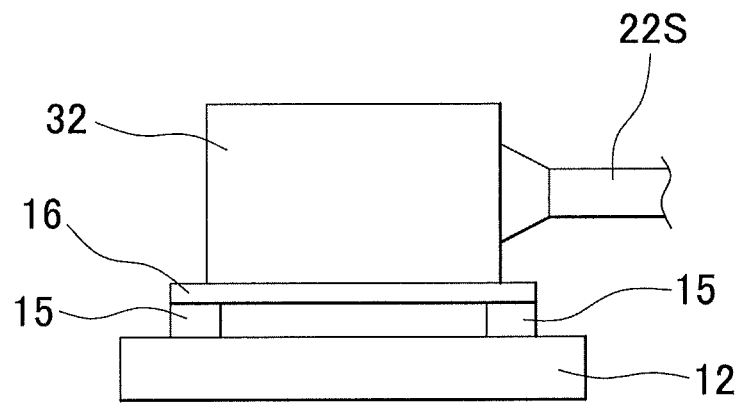
FIG. 5 is an enlarged front view partially illustrating a mounting structure for mounting an external force applying motor on a movable base of a second motion base on the right front side.
Figure 6:
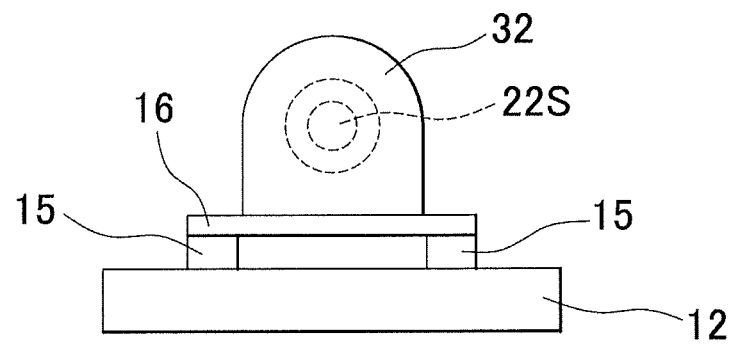
FIG. 6 is a side view illustrating the mounting structure in FIG. 5.
Figure 7:
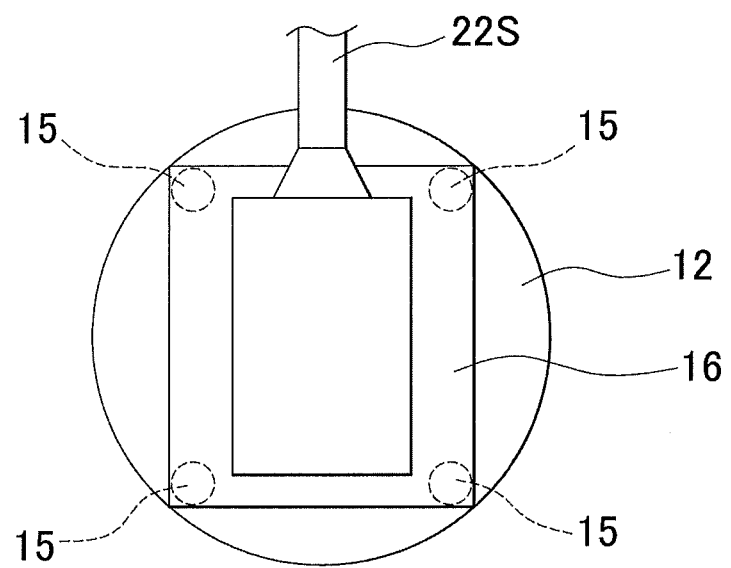
FIG. 7 is a plan view illustrating the mounting structure in FIG. 5.

The external force applying motors 31, 32, 33, 34 are mounted on the movable bases 12 of the second motion bases 4, 5, 6, 7 with the same mounting structure. The mounting structure for mounting the external force applying motor 32 on the movable base 12 of the second motion base 5 on the right front side will be described below in detail with reference to FIG. 5 to FIG. 7. The motor attachment plate 16 is rectangular as viewed in a planar view. A motor body of the external force applying motor 32 is secured onto the motor attachment plate 16. The elastic bodies 15 that are circular as viewed in a planar view are attached to four corner portions of the bottom face of the motor attachment plate 16. That is, the four elastic bodies 15 are secured at their top faces to the four corner portions of the bottom face of the motor attachment plate 16 with adhesive. The bottom face of each of the elastic bodies 15 is secured to the top face of the movable base 12 of the second motion base 5 on the right front side with adhesive. With the mounting structure as described above, the external force applying motor 32 is mounted on the movable base 12 of the second motion base 5 on the right front side via the four elastic bodies 15 and the motor attachment plate 16.

In the vehicle test apparatus 1, the test article installation vehicle body 2 is supported by the first motion base 3. The external force applying motors 31, 32, 33, 34 are supported respectively by the second motion bases 4, 5, 6, 7. In other words, the outer end portions of the axles 21S, 22S, 23S, 24S are supported by the second motion bases 4, 5, 6, 7 via the external force applying motors 31, 32, 33, 34, respectively.

Thus, in the vehicle test apparatus 1, various vehicle body postures can be created by executing drive control of the actuator 13 of the first motion base 3. Further, various road surface conditions can be created by respectively executing drive control of the actuators 13 of the second motion bases 4, 5, 6, 7. Thus, by individually controlling the actuators 13 of the motion bases 3, 4, 5, 6, 7, it is possible to simulate various vehicle travelling conditions.

In the vehicle test apparatus 1, torques similar to the torques (external forces) externally applied to axles of an actual vehicle when the actual vehicle is travelling can be applied individually to the corresponding axles 21S, 22S, 23S, 24S. Thus, drive loads and suspension behaviors in accordance with an actual operating state can be reproduced. In the vehicle test apparatus 1, forces can be directly applied to the test article installation vehicle body 2 by the first motion base 3 in the state where the axles 21S, 22S, 23S, 24S are supported by the second motion bases 4, 5, 6, 7, respectively. Thus, forces similar to the inertial forces that are applied to the vehicle body of the actual vehicle during, for example, acceleration, deceleration, or turning of the actual vehicle, can be applied to the test article installation vehicle body 2 without causing the test article installation vehicle body 2 to move relative to the members that support the axles 21S, 22S, 23S, 24S.

Further, in the vehicle test apparatus 1, the test article installation vehicle body 2 is allowed to make a yawing motion by the first motion base 3. Thus, it is possible to simulate a yawing motion. Hereafter, more detailed description will be provided. In the following description, an X-axis denotes an axis that extends in the longitudinal direction of the vehicle body and passes through the center of gravity of the test article installation vehicle body 2, a Y-axis denotes an axis that extends in the lateral direction of the vehicle body and passes through the center of gravity of the test article installation vehicle body 2, and a Z-axis denotes an axis that extends in the up-down direction of the vehicle body and passes through the center of gravity of the test article installation vehicle body 2. The X-axis, Y-axis and Z-axis belong to a coordinate system (hereinafter, referred to as vehicle body coordinate system) fixed to the test article installation vehicle body 2.

Figure 8:
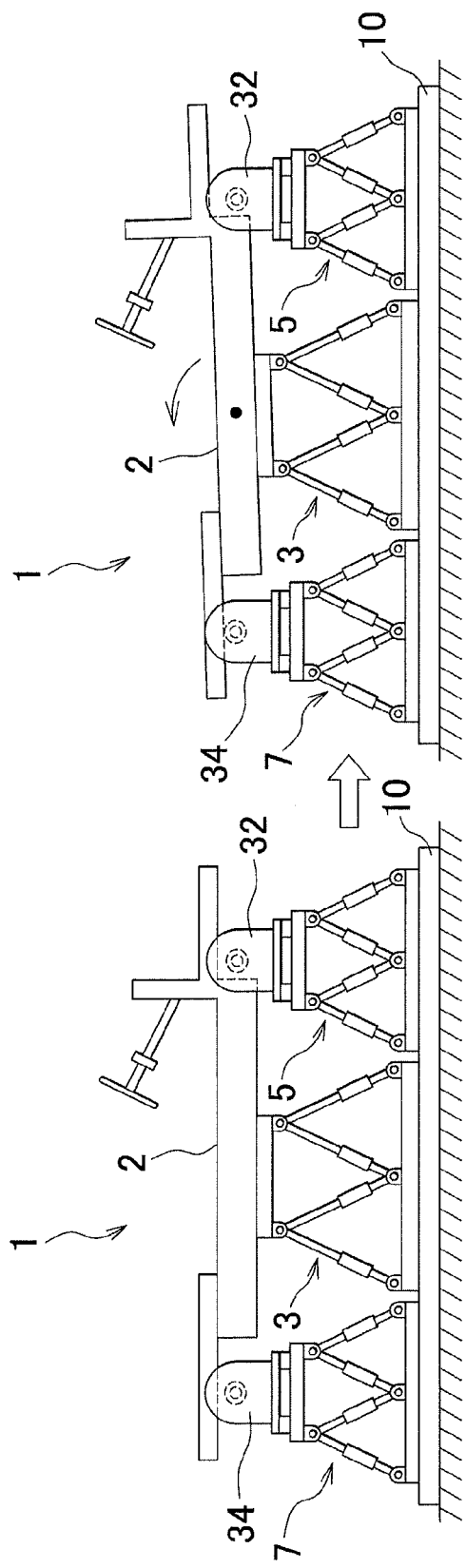
FIG. 8A and FIG. 8B are schematic views for describing an example of the control of motion bases when a vehicle travelling condition during acceleration on a flat road is simulated, FIG. 8A illustrating a condition in which a vehicle is at a standstill on a flat road, and FIG. 8B illustrating a condition in which the vehicle is accelerating on a flat road.

FIG. 8A and FIG. 8B are schematic views for describing an example of the control of the motion bases 3, 4, 5, 6, 7 when a vehicle travelling condition during acceleration on a flat road is simulated. FIG. 8A illustrates a condition in which the vehicle is at a standstill on a flat road. In this case, the top faces of the movable bases 12 of the motion base 3, 4, 5, 6, 7 are parallel to the top face of the base plate 10. Further, the heights of the movable bases 12 of the motion base 3, 4, 5, 6, 7 are adjusted such that an XY plane that is defined by the X-axis and the Y-axis of the vehicle body coordinate system is parallel to the top face of the base plate 10.

The vehicle travelling condition during acceleration on a flat road can be created as follows. As illustrated in FIG. 8B, all the second motion bases 4, 5, 6, 7 are held in the standstill condition illustrated in FIG. 8A, and then the actuator 13 of the first motion base 3 is driven to rotate the movable base 12 of the first motion base 3 in a first direction (direction indicated by an arrow) around the Y axis. The first direction around the Y-axis is such a direction that the front end of the test article installation vehicle body 2 is lifted up.

That is, in the condition in which the external force applying motors 31, 32, 33, 34 are supported by the corresponding second motion bases 4, 5, 6, 7, the movable base 12 of the first motion base 3 is rotated in the first direction around the Y-axis. Thus, a torque for rotating the test article installation vehicle body 2 in the first direction around the Y-axis is directly applied to the test article installation vehicle body 2. That is, a force similar to an inertial force that is applied to the vehicle body of the actual vehicle during acceleration can be directly applied to the test article installation vehicle body 2. Thus, it is possible to simulate the vehicle travelling condition during acceleration on a flat road, without causing the test article installation vehicle body 2 to move relative to the members that support the axles 21S, 22S, 23S, 24S. In this case, it is possible to evaluate a pitching behavior, a suspension behavior, and the like.

Figure 9:
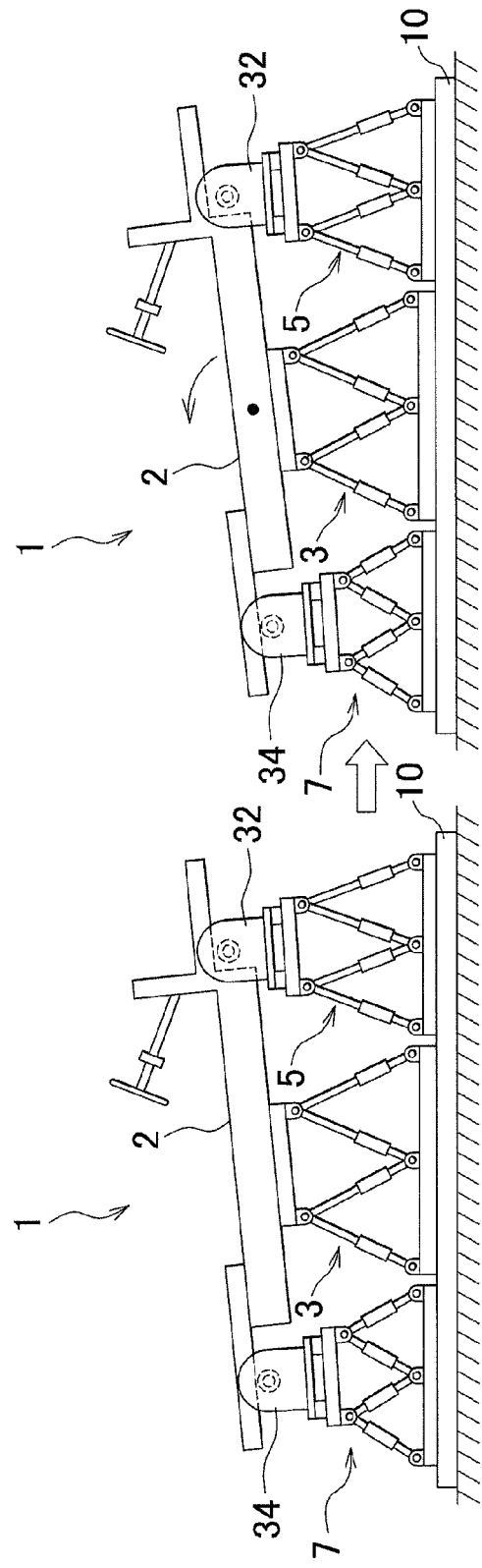
FIG. 9A and FIG. 9B are schematic views for describing an example of the control of the motion bases when a vehicle travelling condition during acceleration on a slope is simulated, FIG. 9A illustrating a condition in which the vehicle is at a standstill on a slope, and FIG. 9B illustrating a condition in which the vehicle is accelerating on a slope.

Note that, in order to simulate a vehicle travelling condition during deceleration, the direction of a torque around the Y-axis, which is applied to the movable base 12 of the first motion base 3, is set to the direction opposite to the first direction that is adopted when the vehicle travelling condition during acceleration is simulated (set to such a direction that the rear end of the test article installation vehicle body 2 is lifted up). FIG. 9A and FIG. 9B are schematic views for describing an example of the control of the motion bases 3, 4, 5, 6, 7 when a vehicle travelling condition during acceleration on a slope is simulated. The case where the slope on which the vehicle is travelling is an uphill slope will be described.

FIG. 9A illustrates a condition in which the vehicle is at a standstill on a slope. In this case, the top faces of the movable bases 12 of the motion bases 3, 4, 5, 6, 7 are parallel to the surface of the assumed slope. The heights of the movable bases 12 of the motion bases 3, 4, 5, 6, 7 are adjusted such that the XY plane defined by the X-axis and the Y-axis of the vehicle body coordinate system is parallel to the surface of the assumed slope.

This standstill condition can be created from the standstill condition on a flat road in the following manner. The movable base 12 of the first motion base 3 is rotated by a prescribed degree in the first direction around the Y-axis in accordance with a slope angle of the slope. At the same time, the movable bases 12 of the second motion bases 4, 5, 6, 7 are rotated by a prescribed degree in the first direction around the Y-axis in accordance with the slope angle of the slope, and are moved in the Z-axis direction (up-down direction). The first direction around the Y-axis is such a direction that the front end of the test article installation vehicle body 2 is lifted up. In this case, the movable bases 12 of the two second motion bases 4, 5 on the front side are moved upward, while the movable bases 12 of the two second motion bases 6, 7 on the rear side are moved downward.

The vehicle travelling condition during acceleration on a slope can be created from the standstill condition illustrated in FIG. 9A in the following manner. As illustrated in FIG. 9B, the movable bases 12 of all the second motion bases 4, 5, 6, 7 are held in the standstill condition on the slope as illustrated in FIG. 9A, and the actuator 13 of the first motion base 3 is driven to rotate the movable base 12 of the first motion base 3 in the first direction (indicated by an arrow) around the Y-axis.

In the condition in which the external force applying motors 31, 32, 33, 34 are respectively supported by the second motion bases, 4, 5, 6, 7, the movable base 12 of the first motion base 3 is rotated in the first direction around the Y-axis. Thus, a torque for rotating the test article installation vehicle body 2 in the first direction around the Y-axis is directly applied to the test article installation vehicle body 2. That is, a force similar to an inertial force that is applied to the vehicle body of the actual vehicle during acceleration on a slope (uphill slope in this case), can be directly applied to the test article installation vehicle body 2. Thus, it is possible to simulate the vehicle travelling condition during acceleration on a slope without causing the test article installation vehicle body 2 to move relative to the members that support the axles 21S, 22S, 23S, 24S. In this case, it is possible to evaluate a pitching behavior, suspension and drive shaft behaviors, hub bearings and the like.

Figure 10:
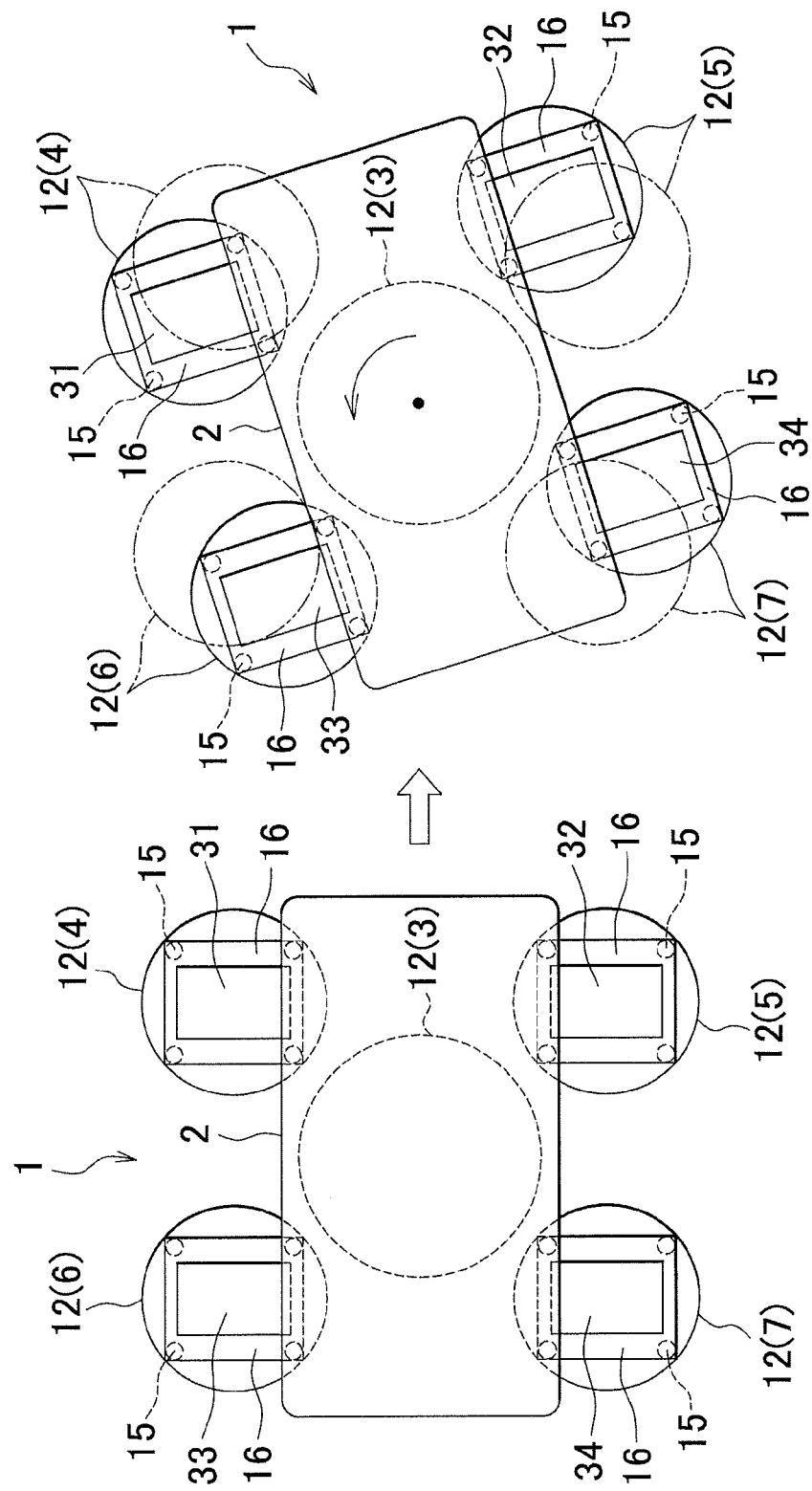
FIG. 10A and FIG. 10B are schematic views for describing an example of the control of the motion bases when a vehicle travelling condition during turning is simulated, FIG. 10A illustrating a condition in which the vehicle is travelling straight ahead, and FIG. 10B illustrating a condition in which the vehicle is turning.

Note that, in order to simulate a vehicle travelling condition during deceleration on a slope, the direction of a torque around the Y-axis, which is applied to the movable base 12 of the first motion base 3, is set to the direction opposite to the first direction that is adopted when the vehicle travelling condition during acceleration on a slope is simulated (set to such a direction that the rear end of the test article installation vehicle body 2 is lifted up). FIG. 10A and FIG. 10B are schematic views for describing an example of the control of the motion bases 3, 4, 5, 6, 7 when a vehicle travelling condition during turning is simulated.

FIG. 10A illustrates a condition in which the vehicle is travelling straight ahead. The case where the vehicle turns to the left, as illustrated in FIG. 10B, from the condition in which the vehicle is travelling straight ahead, will be described. As illustrated in FIG. 10B, in order to turn the test article installation vehicle body 2 to the left, the movable base 12 of the first motion base 3 is rotated counterclockwise around the Z-axis as viewed in a planar view. The movable bases 12 of all the second motion bases, 4, 5, 6, 7 are rotated counterclockwise around the Z-axis as viewed in a plan view, and are moved in the XY plane defined by the X-axis and Y-axis of the vehicle body coordinate system in order to move the external force applying motors 31, 32, 33, 34 in accordance with the rotation of the test article installation vehicle body 2. Thus, the movable bases 12 of the second motion bases, 4, 5, 6, 7 are moved from positions indicated by two-dot chain lines to positions indicated by solid lines in FIG. 10B. Thus, the travelling condition during turning can be simulated. In this case, it is possible to evaluate axial loads applied to the axles 21S, 22S, 23S, 24S, a steering torque, a rack axis force, a hub bearings and the like.

In the vehicle test apparatus 1, various vehicle travelling conditions (vehicle behaviors) are reproduced by moving the test article installation vehicle body 2 and the axles 21S, 22S, 23S, 24S that are supported by the five motion bases 3, 4, 5, 6, 7. Therefore, in order to reproduce the various vehicle travelling conditions, it is necessary to move all the motion bases 3, 4, 5, 6, 7 in association with each other while relative positional relationships among secured points at which the motion bases 3, 4, 5, 6, 7 are secured to the vehicle (the test article installation vehicle body 2 and the external force applying motors 31, 32, 33, 34) are maintained. However, due to individual differences of machine elements, control performance or the like, there is a possibility that it will not be possible to accurately move all the motion bases 3, 4, 5, 6, 7 in association with each other such that the relative positional relationships among the secured points are maintained.

In the first embodiment, the external force applying motors 31, 32, 33, 34 to which the axles 21S, 22S, 23S, 24S are connected, are respectively mounted on the second motion bases, 4, 5, 6, 7 via the elastic bodies 15. Thus, even if errors are caused in the associating operation among all the motion bases 3, 4, 5, 6, 7, the errors can be absorbed through deformations of the elastic bodies 15. Thus, it is possible to prevent forces that are not actually applied to the actual vehicle, from being applied to the test article installation vehicle body 2. Further, controllers (for example, an actuator controller 70, and motion controllers 3C, 4C, 5C, 6C, 7C (described later) illustrated in FIG. 11) for the motion bases 3, 4, 5, 6, 7 are not required to have high control performances.

In the first embodiment, the elastic bodies 15 are interposed between the external force applying motors 31, 32, 33, 34 to which the axles 21S, 22S, 23S, 24S are connected and the second motion bases, 4, 5, 6, 7. Alternatively, an elastic body may be interposed between the test article installation vehicle body 2 and the first motion base 3. The shape of each elastic body is not limited to a circular shape in a planar view, but may be any shapes. As indicated by broken lines in FIG. 4, torque sensors 21T, 22T, 23T, 24T that detect torques applied respectively to the axles 21S, 22S, 23S, 24S may be provided on the axles 21S, 22S, 23S, 24S, respectively.

Figure 11:
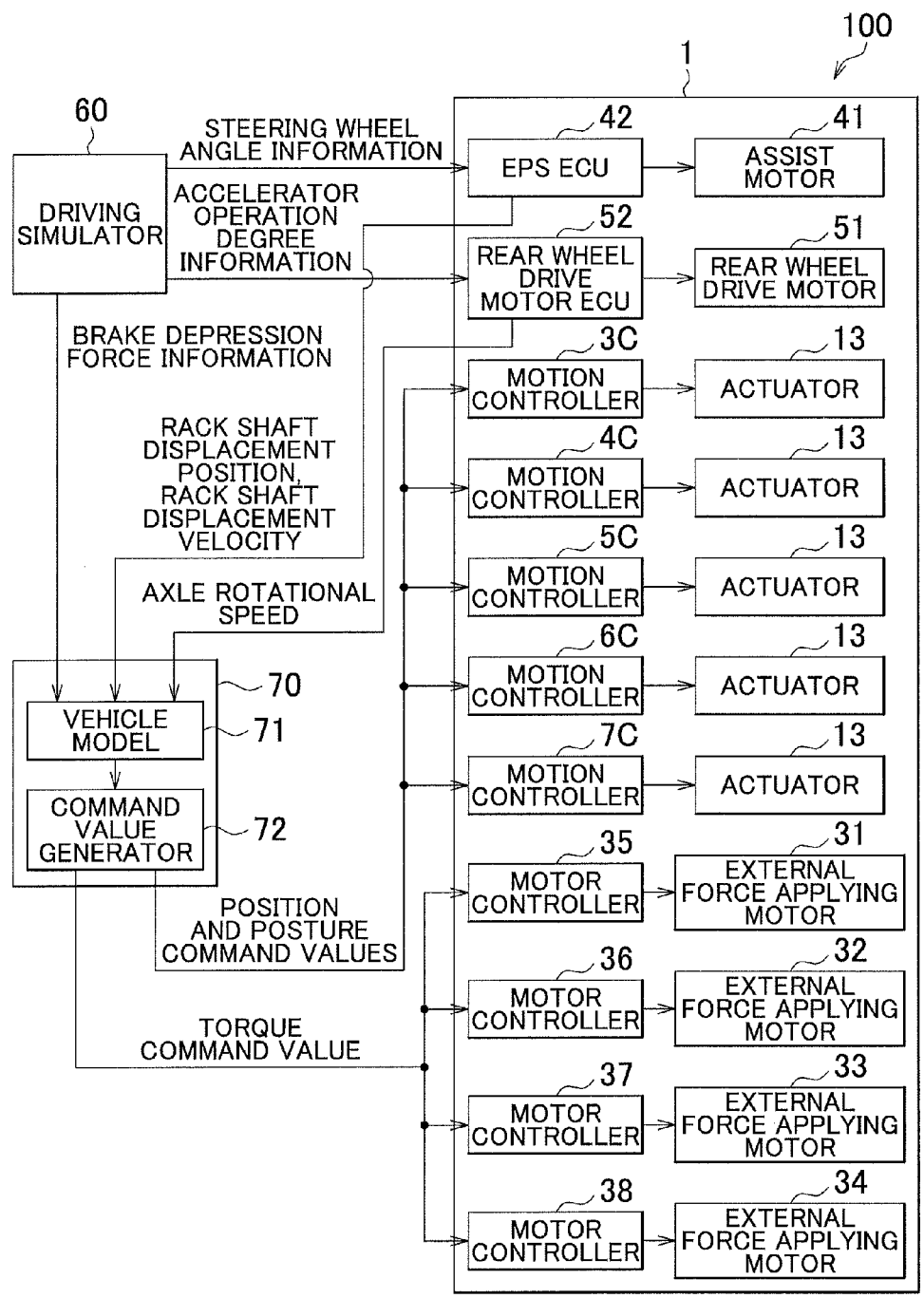
FIG. 11 is a block diagram schematically illustrating the electrical configuration of a vehicle test system.

Hereafter, a vehicle test system 100 including the vehicle test apparatus 1 will be described. FIG. 11 is a block diagram illustrating the electrical configuration of the vehicle test system 100. The vehicle test system 100 includes a driving simulator 60, the vehicle test apparatus 1 and an actuator controller 70. The driving simulator 60 virtually simulates a vehicle operation, and is manipulated by an operator. In the vehicle test apparatus 1, the EPS 40, the rear wheel drive module 50 and motor controllers 35, 36, 37, 38 that control the external force applying motors 31, 32, 33, 34 are mounted. The actuator controller 70 is a computer, and controls the motion bases 3, 4, 5, 6, 7 of the vehicle test apparatus 1 and the motor controllers 35, 36, 37, 38 mounted on the vehicle test apparatus 1.

As described above, the EPS 40 includes the assist motor 41, the EPS ECU 42 that controls the assist motor 41, and the linear displacement sensor (not illustrated) that detects an axial displacement position of the rack shaft. As described above, the rear wheel drive module 50 includes the rear wheel drive motor 51, the rear wheel drive motor ECU 52 that controls the rear wheel drive motor 51, and the rotation angle sensor (not illustrated) that detects a rotation angle of at least one of the rear wheel axles 23S, 24S.

For example, steering angle information (steering wheel angle information), accelerator operation degree information, and brake depression force information according to an operation of the driving simulator 60 are output from the driving simulator 60. The steering angle information output from the driving simulator 60 is transmitted to the EPS ECU 42 mounted on the vehicle test apparatus 1. The accelerator operation degree information output from the driving simulator 60 is transmitted to the rear wheel drive motor ECU 52 mounted on the vehicle test apparatus 1. The brake depression force information output from the driving simulator 60 is transmitted to the actuator controller 70. Instead of the brake depression force information, brake depression degree information may be used.

The EPS ECU 42 determines a steering torque on the basis of the steering angle information transmitted from the driving simulator 60, and executes drive control of the assist motor 41 on the basis of the thus determined steering torque. The EPS ECU 42 measures an axial displacement amount of the rack shaft included in the EPS 40 (hereinafter, referred to as "rack shaft displacement amount"), and an axial displacement velocity of the rack shaft (hereinafter, referred to as "rack shaft displacement velocity"), on the basis of an output signal from the linear displacement sensor, and transmits the thus measured values to the actuator controller 70.

The rear wheel drive motor ECU 52 determines a torque command value for the rear wheel drive motor 51 on the basis of the accelerator operation degree information transmitted from the driving simulator 60, and executes drive control of the rear wheel drive motor 51 on the basis of the thus determined torque command value. The rear wheel drive motor ECU 52 measures rotational speeds of the rear wheel axles 23S, 24S (hereinafter, referred to as "axle rotational speeds") on the basis of an output signal from the rotation angle sensor, and transmits the thus measured values to the actuator controller 70.

The actuator controller 70 includes a vehicle model 71 and a command value generator 72. The vehicle model 71 receives the brake depression force information output from the driving simulator 60, the rack shaft displacement amount and the rack shaft displacement velocity that are transmitted from the EPS ECU 42, and the axle rotational speed transmitted from the rear wheel drive motor ECU 52. The vehicle model 71 creates a position and a posture of the vehicle body, positions and postures of the wheels, and external forces applied to the axles in accordance with the operating condition simulated by the driving simulator 60.

The command value generator 72 generates command values (position and posture command values (position and posture target values)) of positions and postures that are to be taken by the motion bases 3, 4, 5, 6, 7 on the basis of the position and the posture of the vehicle body and the positions and the postures of the wheels that are created by the vehicle model 71. The command value generator 72 generates command values (torque command values) of motor torques that should be generated by the external force applying motors 31, 32, 33, 34 on the basis of the external forces that are generated by the vehicle model 71 and applied to the axles 21S, 22S, 23S, 24S.

The position and posture command values for the motion bases 3, 4, 5, 6, 7, which are generated by the command value generator 72, are provided to the motion controllers 3C, 4C, 5C, 6C, 7C for the corresponding motion bases 3, 4, 5, 6, 7. The motion controllers 3C, 4C, 5C, 6C, 7C control the corresponding actuators 13 on the basis of the position and posture command values provided by the command value generator 72. Thus, the motion bases 3, 4, 5, 6, 7 are controlled such that the movable bases 12 of the motion bases 3, 4, 5, 6, 7 take positions and postures that correspond to the position and posture command values.

The torque values for the respective external force applying motors 31, 32, 33, 34, which are generated by the command value generator 72, are provided to the corresponding motor controllers 35, 36, 37, 38. The motor controllers 35, 36, 37, 38 control the corresponding external force applying motors 31, 32, 33, 34 on the basis of the torque command values provided by the command value generator 72. Thus, the external force applying motors 31, 32, 33, 34 generate motor torques corresponding to the torque command values.

Preferably, the actuator controller 70 is mounted on the test article installation vehicle body 2, as indicated by broken lines in FIG. 1, for the following reason. The rack shaft displacement amount and the rack shaft displacement velocity are transmitted in the form of analog signals from the EPS ECU 42 to the actuator controller 70. Further, axle rotational speeds are transmitted in the form of analog signals from the rear wheel drive motor ECU 52 to the actuator controller 70. Therefore, the EPS ECU 42 and the actuator controller 70 are connected to each other through wirings for analog signals, and the rear wheel drive motor ECU 52 and the actuator controller 70 are connected to each other through wirings for analog signals. As the wirings for analog signals become longer, analog signals are more likely to pick up noise, which cause a possibility that errors in the analog signals will become larger. As indicated by the broken lines in FIG. 1, if the actuator controller 70 is mounted on the test article installation vehicle body 2, the lengths of the wirings for analog signals can be shortened.

Figure 12:
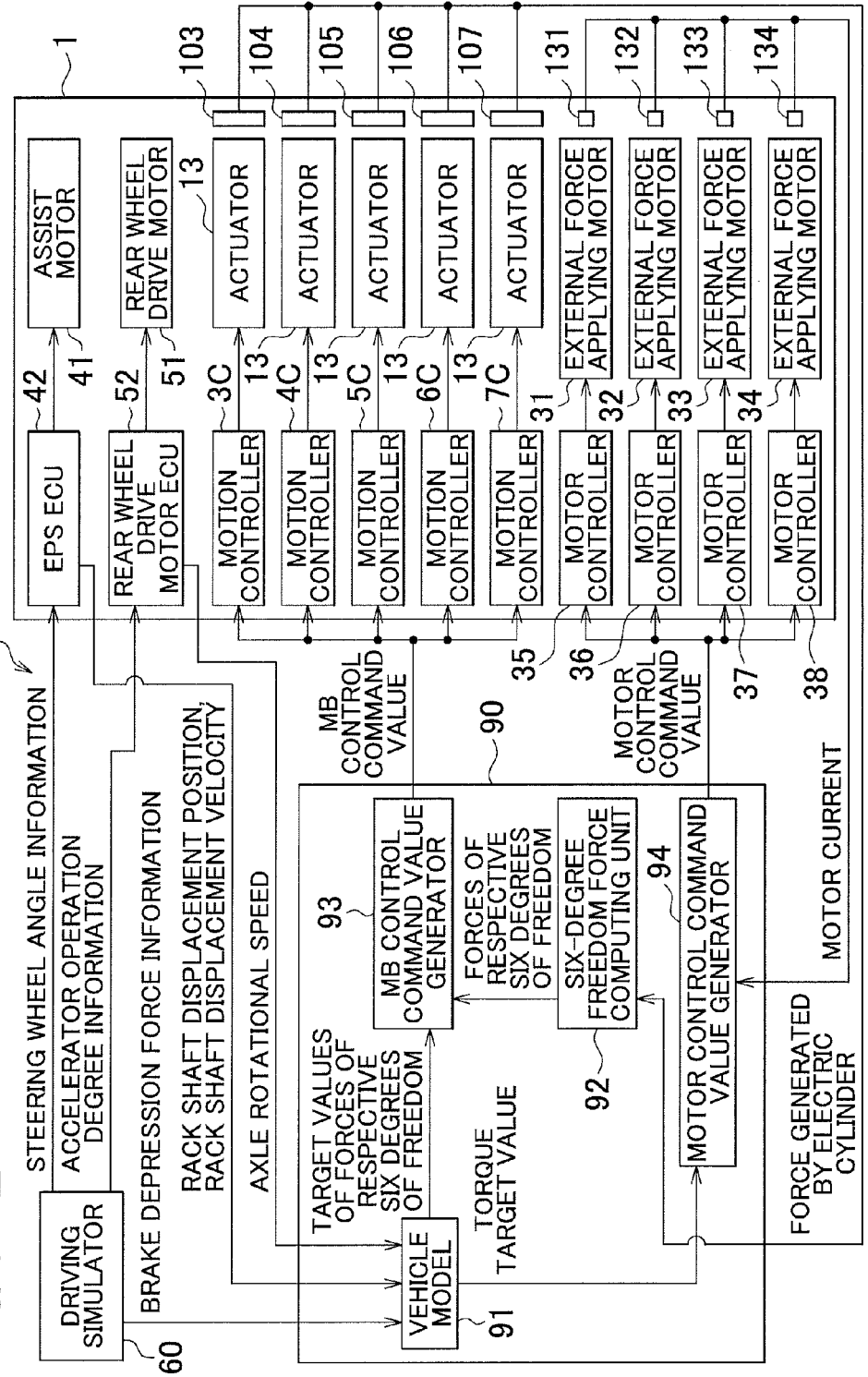
FIG. 12 is a block diagram illustrating the schematic electrical configuration of another vehicle test system.

FIG. 12 illustrates another vehicle test system 100A including the vehicle test apparatus 1. The vehicle test system 100A includes the driving simulator 60, the vehicle test apparatus 1 and an actuator controller 90. The driving simulator 60 virtually simulates a vehicle operation, and is manipulated by an operator. In the vehicle test apparatus 1, the EPS 40, the rear wheel drive module 50 and motor controllers 35, 36, 37, 38 that control the external force applying motors 31, 32, 33, 34 are mounted. The actuator controller 90 is a computer, and controls the motion bases 3, 4, 5, 6, 7 of the vehicle test apparatus 1 and the motor controllers 35, 36, 37, 38 mounted on the vehicle test apparatus 1.

The EPS 40 includes the assist motor 41, the EPS ECU 42 that controls the assist motor 41, and the linear displacement sensor (not illustrated) that detects an axial displacement position of the rack shaft. As described above, the rear wheel drive module 50 includes the rear wheel drive motor 51, the rear wheel drive motor ECU 52 that controls the rear wheel drive motor 51, and the rotation angle sensor (not illustrated) that detects a rotation angle of at least one of the rear wheel axles 23S, 24S.

Each of the motion bases 3, 4, 5, 6, 7 is provided with six force sensors that individually detect forces generated by six electric cylinders that constitute the actuator 13. FIG. 12 illustrates force sensor groups 103, 104, 105, 106, 107 each including the six force sensors that are provided on a corresponding one of the motion bases 3, 4, 5, 6, 7. The force sensors are, for example, load cells. The external force applying motors 31, 32, 33, 34 are provided with current sensors 131, 132, 133, 134 that detect motor currents applied to the external force applying motors 31, 32, 33, 34, respectively.

For example, steering angle information (steering wheel angle information), accelerator operation degree information, and brake depression force information according to an operation of the driving simulator 60 are output from the driving simulator 60. The steering angle information output from the driving simulator 60 is transmitted to the EPS ECU 42. The accelerator operation degree information output from the driving simulator 60 is transmitted to the rear wheel drive motor ECU 52. The brake depression force information output from the driving simulator 60 is transmitted to the actuator controller 90. Instead of the brake depression force information, brake depression degree information may be used.

The EPS ECU 42 determines a steering torque on the basis of the steering angle information transmitted from the driving simulator 60, and executes drive control of the assist motor 41 on the basis of the thus determined steering torque. The EPS ECU 42 measures an axial displacement amount of the rack shaft included in the EPS 40 (hereinafter, referred to as "rack shaft displacement amount"), and an axial displacement velocity of the rack shaft (hereinafter, referred to as "rack shaft displacement velocity"), on the basis of an output signal from the linear displacement sensor, and transmits the thus measured values to the actuator controller 90.

The rear wheel drive motor ECU 52 determines a torque command value for the rear wheel drive motor 51 on the basis of the accelerator operation degree information transmitted from the driving simulator 60, and executes drive control of the rear wheel drive motor 51 on the basis of the thus determined torque command value. The rear wheel drive motor ECU 52 measures rotational speeds of the rear wheel axles 23S, 24S (hereinafter, referred to as "axle rotational speeds") on the basis of an output signal from the rotation angle sensor, and transmits the thus measured values to the actuator controller 90.

The actuator controller 90 includes a vehicle model 91, a six-degree freedom force computing unit 92, a MB control command value generator 93 and a motor control command value generator 94. The vehicle model 91 receives the brake depression force information output from the driving simulator 60, the rack shaft displacement amount and the rack shaft displacement velocity that are transmitted from the EPS ECU 42, and the axle rotational speed transmitted from the rear wheel drive motor ECU 52. The vehicle model 91 generates control target values corresponding to an operating situation simulated by the driving simulator 60, on the basis of the thus received information. The control target values generated by the vehicle model 91 include target values of forces of respective six degrees of freedom (target values of forces of respective six degrees of freedom) that should be generated by the associated motion bases 3, 4, 5, 6, 7, and target values of motor torque values (torque target values) that should be generated by the external force applying motors 31, 32, 33, 34. The forces of respective six degrees of freedom consist of a force in the X-axis direction, a force in the Y-axis direction, a force in the Z-axis direction, a torque around the X-axis, a torque around the Y axis and a torque around the X-axis in the XYZ coordinate system fixed to each of the motion bases 3, 4, 5, 6, 7.

The six-degree freedom force computing unit 92 computes forces of respective six degrees of freedom, which are generated by each of the motion bases 3, 4, 5, 6, 7, on the basis of the forces generated by the six electric cylinders, which are detected by a corresponding one of the sensor groups 103, 104, 105, 106, 107. The MB control command value generator 93 generates control command values (MB control command values) for each of the motion bases 3, 4, 5, 6, 7, which allow deviations between the forces of respective six degrees of freedom computed by the six-degree freedom force computing unit 92 and the target values of forces of respective six degrees of freedom generated by the vehicle model 91 to approach zero, and provides the thus generated MB control command values to the corresponding motion controllers 3C, 4C, 5C, 6C, 7C.

The MB control command values can be generated by executing, for example, PI (proportional-integral) computation or PID (proportional-integral-derivative) computation on the deviations.

Each of the motion controllers 3C, 4C, 5C, 6C, 7C controls the forces that are generated by the six electric cylinders that constitute a corresponding one of the actuators 13 on the basis of the MB control command values provided by the MB command value generator 93. Thus, the forces of respective six degrees of freedom generated by each of the motion bases 3, 4, 5, 6, 7 are controlled so as to be equal to the target values of forces of six degrees of freedom generated by the vehicle model 91.

The motor control command value generator 94 converts the torque target value for each of the external force applying motors 31, 32, 33, 34, which is generated by the vehicle model 91, into a current target value for a corresponding one of the external force applying motors 31, 32, 33, 34. The motor control command value generator 94 computes, for each of the external force applying motors 31, 32, 33, 34, a control command value (motor control command value) that allows a deviation between a motor current detected by a corresponding one of the current sensors 131, 132, 133, 134, and the corresponding current target value to approach zero, and provides the thus computed motor control command value to a corresponding one of the motor controllers 35, 36, 37, 38. Each of the motor controllers 35, 36, 37, 38 controls a corresponding one of the external force applying motors 31, 32, 33, 34 on the basis of the motor control command value provided by the motor control command value generator 94. Thus, the external force applying motors 31, 32, 33, 34 generate motor torques corresponding to the torque target values generated by the vehicle model 91.

Note that, five six-axis force sensors that detect forces of respective six degrees of freedom applied to the movable bases 12 of the motion bases 3, 4, 5, 6, 7 may be used, instead of the force sensor groups 103, 104, 105, 106, 107. In this case, the six-degree freedom force computing unit 92 is no longer required. That is, the forces of respective six degrees of freedom that are detected by each of the six-axis force sensors are provided to the control command value generator 93.

The vehicle test system 100 illustrated in FIG. 11 is a position and posture control system that controls the actuators 13 of the motion bases 3, 4, 5, 6, 7 so as to allow the positions and postures of the motion bases 3, 4, 5, 6, 7 to coincide with the position and posture target values (position and posture command values) set by the actuator controller 70. On the other hand, the vehicle test system 100A illustrated in FIG. 12 is a force control system that controls the actuators 13 of the motion bases 3, 4, 5, 6, 7 so as to allow the forces of respective six degrees of freedom generated by the motion bases 3, 4, 5, 6, 7 to coincide with the target values of forces of respective six degrees of freedom set by the actuator controller 90.

Figure 13:
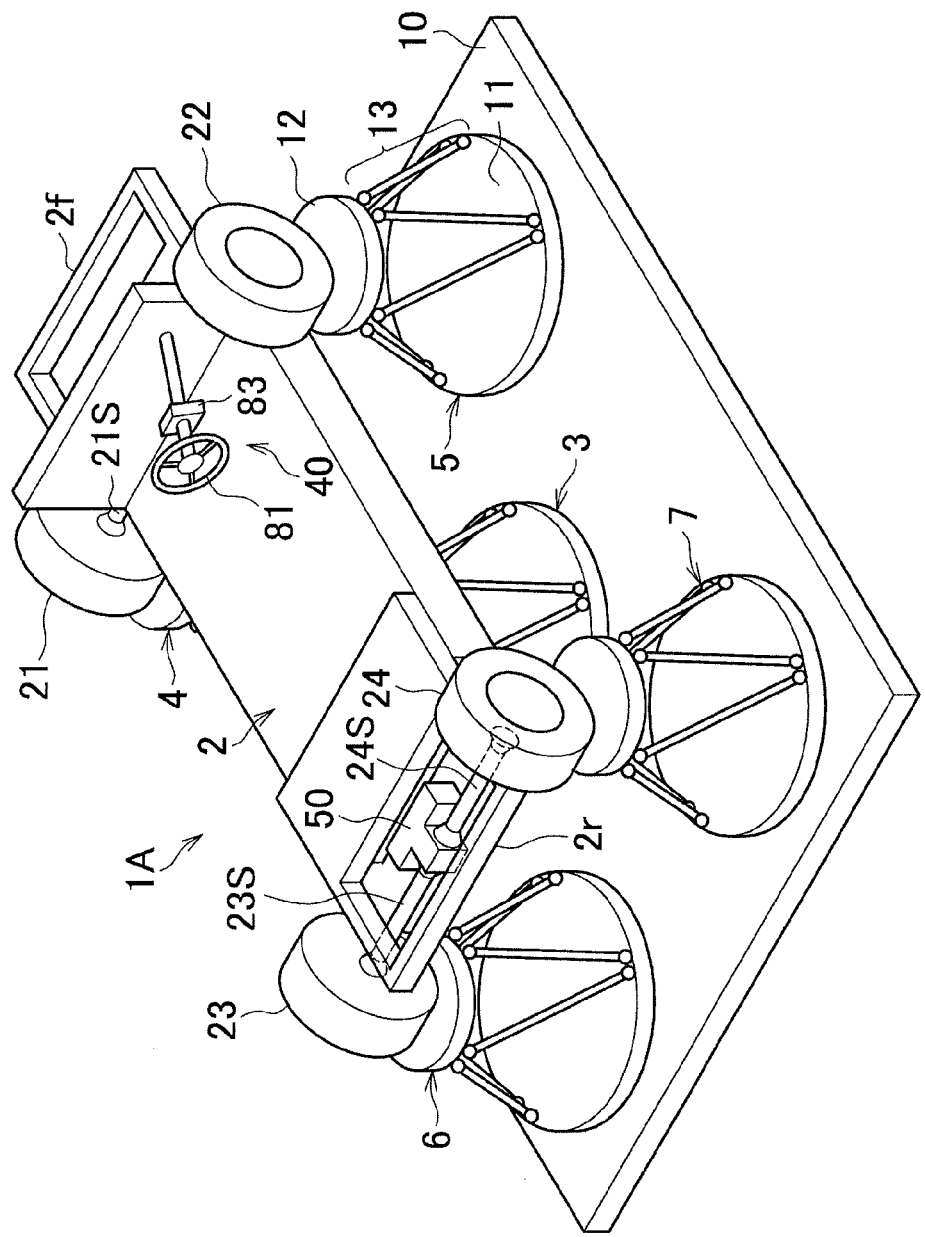
FIG. 13 is a schematic perspective view illustrating the appearance of a vehicle test apparatus according to a second embodiment of the invention.
Figure 14:
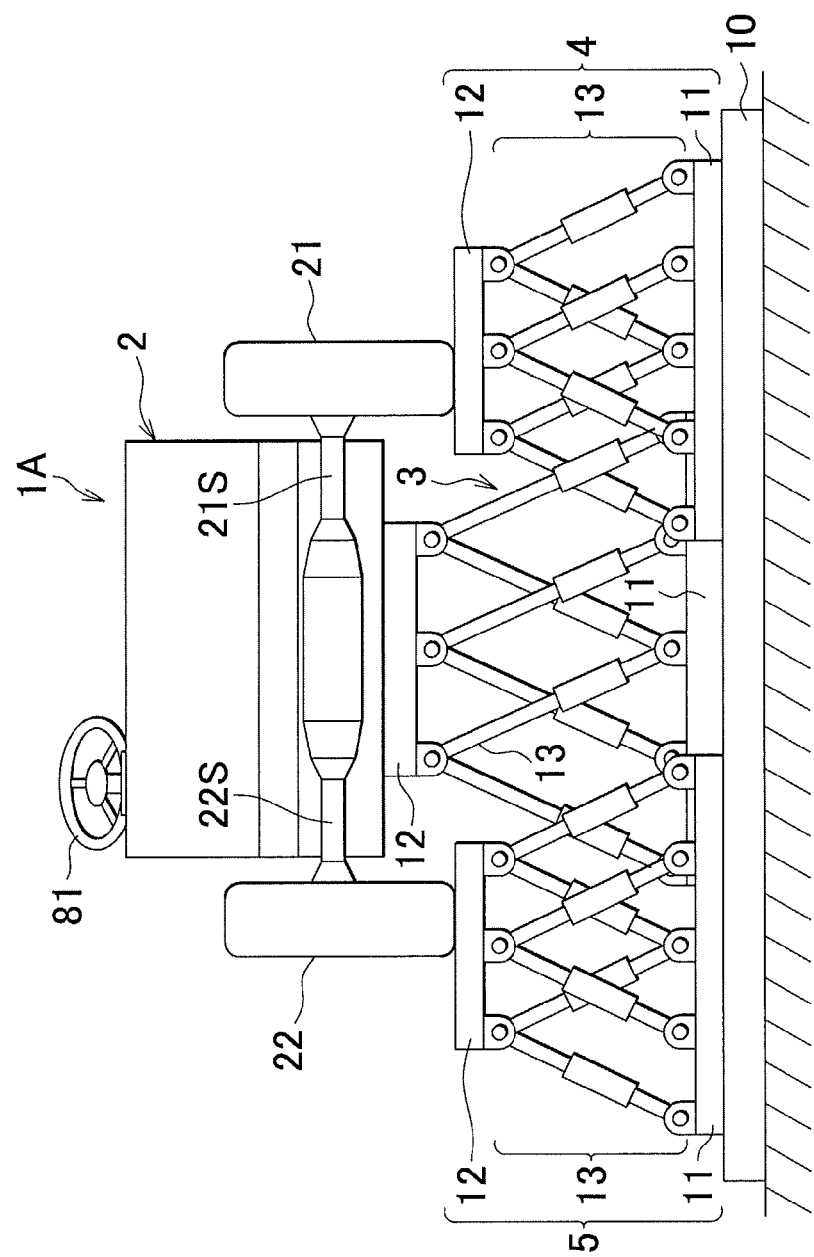
FIG. 14 is a front view schematically illustrating the vehicle test apparatus in FIG. 13.
Figure 15:
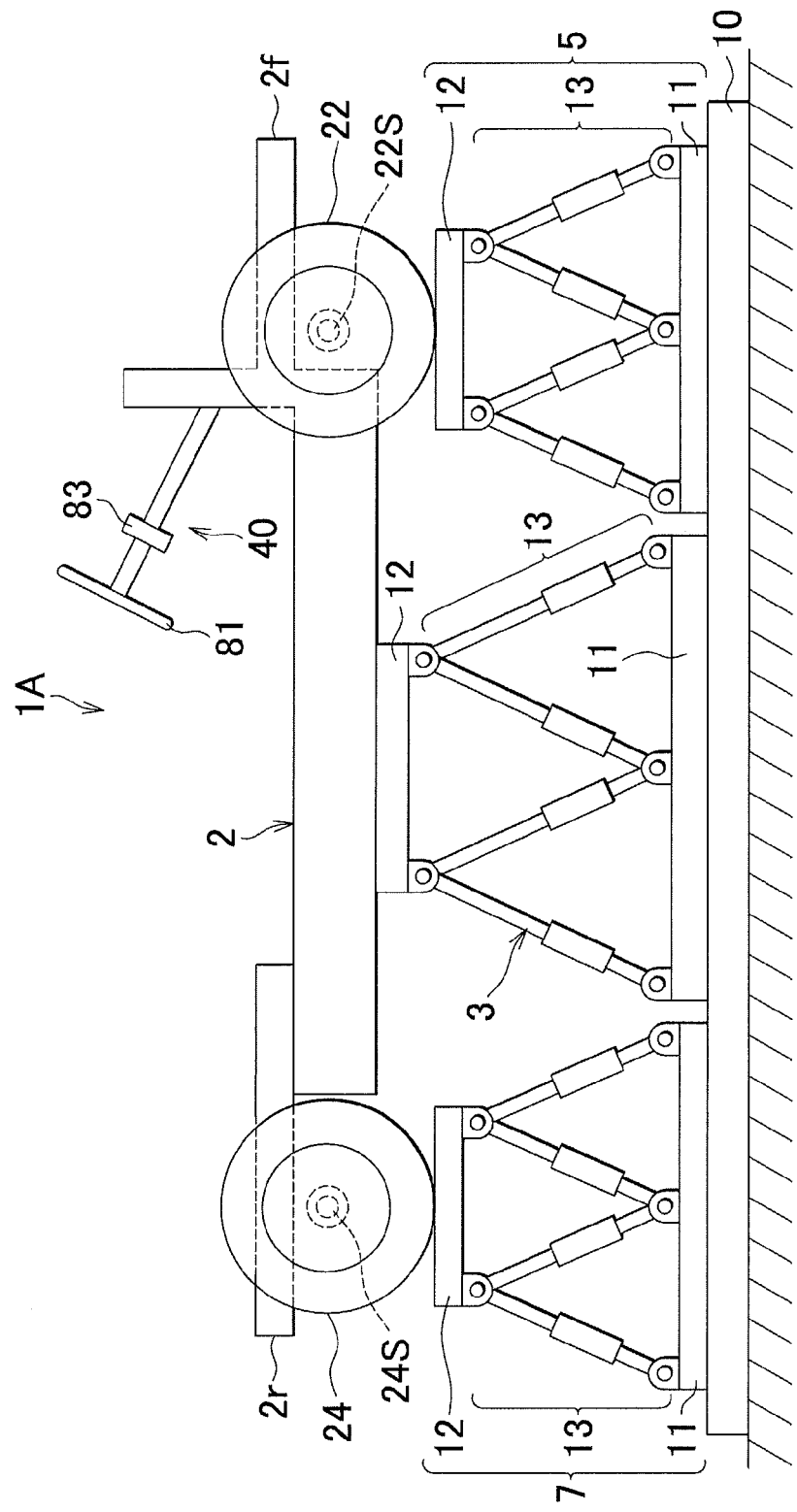
FIG. 15 is a side view schematically illustrating the vehicle test apparatus in FIG. 13.
Figure 16:
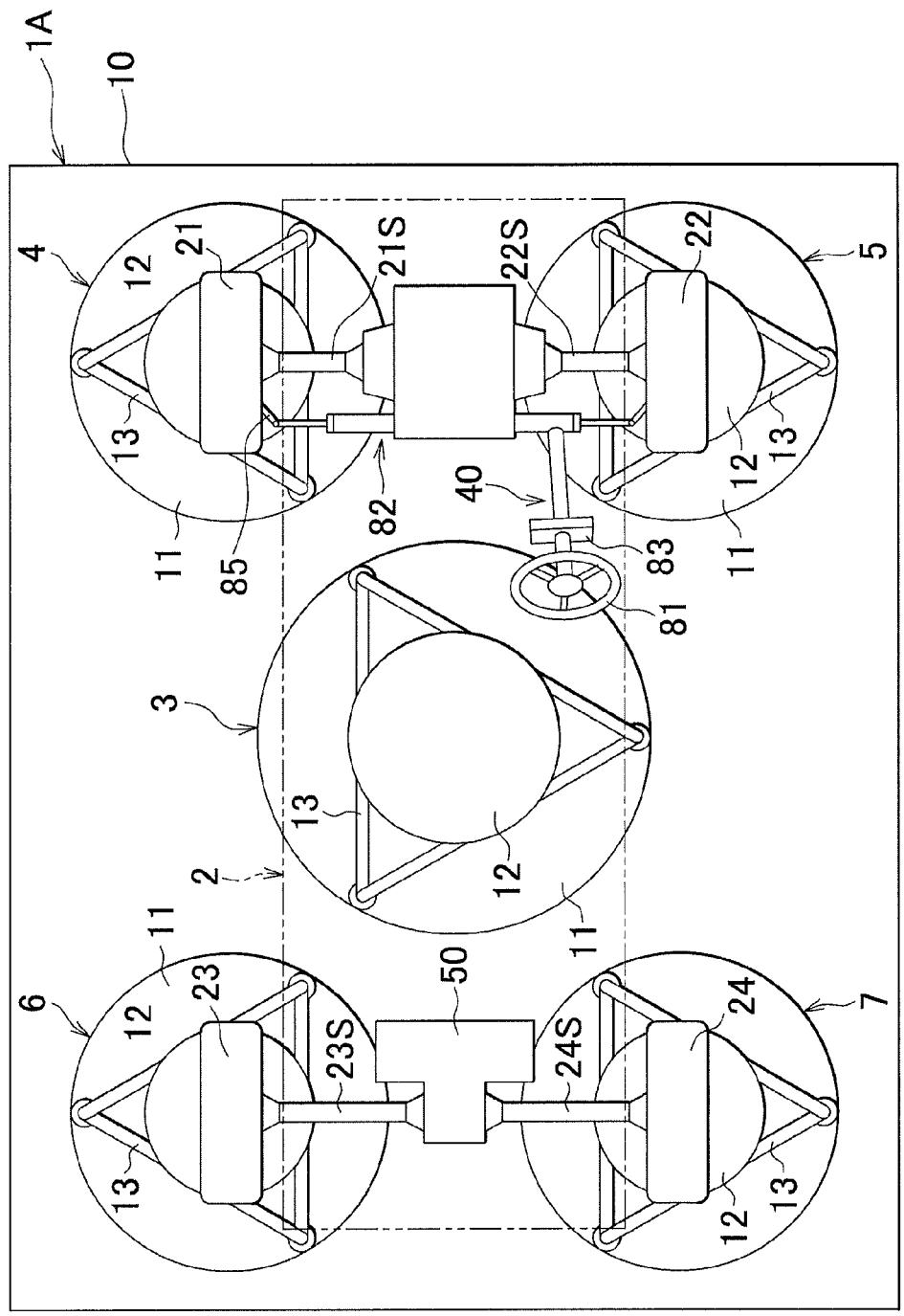
FIG. 16 is a plan view schematically illustrating the vehicle test apparatus in FIG. 13.

FIG. 13 is a schematic perspective view that illustrates the appearance of a vehicle test apparatus 1A according to a second embodiment of the invention. In FIG. 13, the same components as those in FIG. 1 are denoted by the same reference symbols as those in FIG. 1. FIG. 14 is a front view schematically illustrating the vehicle test apparatus 1A in FIG. 13. FIG. 15 is a side view schematically illustrating the vehicle test apparatus 1A in FIG. 13. FIG. 16 is a plan view schematically illustrating the vehicle test apparatus 1 A in FIG. 13. In FIG. 16, the test article installation vehicle body is indicated by two-dot chain lines.

In the vehicle test apparatus 1A according to the second embodiment, the external force applying motors 31, 32, 33, 34 as in the vehicle test apparatus 1 explained in the first embodiment are not connected to the axles 21S, 22S, 23S, 24S. Alternatively, in the vehicle test apparatus 1A according to the second embodiment, a left front wheel 21, a right front wheel 22, a left rear wheel 23 and a right rear wheel 24 are fitted respectively to the axles 21S, 22S, 23S, 24S.

The wheels 21, 22, 23, 24 are disposed respectively on the movable bases 12 of the second motion bases, 4, 5, 6, 7. That is, the wheels 21, 22, 23, 24 are supported respectively by the second motion bases, 4, 5, 6, 7. In other words, the axles 21S, 22S, 23S, 24S are supported at their outer end portions by the second motion bases, 4, 5, 6, 7 via the wheels 21, 22, 23, 24, respectively.

Even in this second embodiment, as well as in the first embodiment, the column assist-type EPS 40, and the rear wheel drive module 50 that drives the rear wheel axles 23S, 24S with the use of the electric motor are installed as test articles (to be evaluated) on the test article installation vehicle body 2.

What is claimed is:

1. A vehicle test apparatus comprising:
a test article installation vehicle body to which four axles corresponding to four wheels that are a left front wheel, a right front wheel, a left rear wheel and a right rear wheel are attached, and on which a test article is installed;
a first motion base that supports the test article installation vehicle body, and that allows the test article installation vehicle body to make motions of six degrees of freedom;
four second motion bases each of which supports a corresponding one of the axles, and each of which allows a corresponding one of the axles to make motions of six degrees of freedom; and
four electric motors that are connected to outer end portions of the respective axles, and that apply torques to the respective axles, wherein
each of the motion bases includes a stationary base, a movable base disposed above the stationary base, and an actuator that is disposed between and connected to the stationary base and the movable base, and that allows the movable base to make motions of six degrees of freedom,
the test article installation vehicle body is disposed on the movable base of the first motion base and fixed to the movable base of the first motion base, and
the axles are supported by the corresponding movable bases of the second motion bases via motor bodies of the electric motors to which the corresponding axles are connected.

2. A vehicle test system comprising:
the vehicle test apparatus according to claim 1; and
a control unit that controls the motion bases.

3. The vehicle test system according to claim 2, wherein the control unit comprises:
a position and posture target value generator that generates target values of a position and a posture to be taken by each of the motion bases, for each of the motion bases; and
a controller that controls each of the motion bases so as to cause a position and a posture of each of the motion bases to coincide with the target values of the position and the posture generated by the position and posture target value generator.

4. The vehicle test system according to claim 2, wherein the control unit comprises:
a detector that detects forces of respective six degrees of freedom generated by each of the motion bases;
a force target value generator that generates, for each of the motion bases, target values of forces of respective six degrees of freedom to be generated by each of the motion bases; and
a controller that controls each of the motion bases so as to cause the forces of respective six degrees of freedom detected by the detector, to coincide with the target values of forces generated by the force target value generator.

5. A vehicle test system comprising:
a vehicle test apparatus; and
a control unit, wherein
the vehicle test apparatus comprises:
a test article installation vehicle body to which four axles corresponding to four wheels that are a left front wheel, a right front wheel, a left rear wheel and a right rear wheel are attached, and on which a test article is installed;
a first motion base that supports the test article installation vehicle body, and that allows the test article installation vehicle body to make motions of six degrees of freedom; and
four second motion bases each of which supports a corresponding one of the axles, and each of which allows a corresponding one of the axles to make motions of six degrees of freedom, and
the control unit controls the motion bases and comprises:
a position and posture target value generator that generates target values of a position ad a posture to be taken by each of the motion bases, for each of the motion bases; and
a controller that controls each of the motion bases so as to cause a position ad a posture of each of the motion bases to coincide with the target values of the position and the posture generated by the position and posture target value generator.

6. A vehicle test system comprising:
a vehicle test apparatus; and
a control unit, wherein
the vehicle test apparatus comprises:
a test article installation vehicle body to which four axles corresponding to four wheels that are a left front wheel, a right front wheel, a left rear wheel and a right rear wheel are attached, and on which a test article is installed;
a first motion base that supports the test article installation vehicle body, and that allows the test article installation vehicle body to make motions of six degrees of freedom; and
four second motion bases each of which supports a corresponding one of the axles, and each of which allows a corresponding one of the axles to make motions of six degrees of freedom, and
the control unit controls the motion bases and comprises:
a detector that detects forces of respective six degrees of freedom generated by each of the motion bases;
a force target value generator that generates, for each of the motion bases, target values of forces of respective six degrees of freedom to be generated by each of the motion bases; and a controller that controls each of the motion bases so as to cause the forces of respective six degrees of freedom detected by the detector, to coincide with the target values of forces generated by the force target value generator.

* * * * *